United States Patent
Roffe et al.

(10) Patent No.: US 9,689,424 B1
(45) Date of Patent: Jun. 27, 2017

(54) TIERED AXIAL TAPER ROLLER BEARING WITH COMMON CENTER RING

(71) Applicant: Schaeffler Technologies AG & Co. KG, Herzogenaurach (DE)

(72) Inventors: Dennis Roffe, Fort Mill, SC (US); Michael Heaton, Rock Hill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/156,776

(22) Filed: May 17, 2016

(51) Int. Cl.
F16C 19/55 (2006.01)
F16C 19/38 (2006.01)
F16C 23/08 (2006.01)

(52) U.S. Cl.
CPC ............ F16C 19/386 (2013.01); F16C 23/08 (2013.01)

(58) Field of Classification Search
CPC ...... F16C 19/55; F16C 19/386; F16C 19/383; F16C 19/505
See application file for complete search history.

(56) References Cited

U.S. PATENT DOCUMENTS

| | | | | |
|---|---|---|---|---|
| 731,720 A * | 6/1903 | Thomas | ................. | F16C 19/55 384/589 |
| 1,222,978 A * | 4/1917 | O'Connor | ............... | F16C 19/30 384/594 |
| 1,769,933 A * | 7/1930 | Arutunoff | ............... | F16C 19/55 384/613 |
| 3,165,016 A * | 1/1965 | Woodle | ................ | B23Q 1/5468 82/147 |
| 4,045,100 A * | 8/1977 | Beauchet | ................ | F16C 19/38 384/461 |
| 4,618,271 A * | 10/1986 | Li | ......................... | F16C 33/306 384/461 |
| 6,592,265 B1 * | 7/2003 | Rossi | ..................... | B21B 13/023 384/619 |
| 6,857,787 B1 | 2/2005 | Meier et al. | | |
| 8,523,453 B2 | 9/2013 | Loeschner et al. | | |
| 8,646,982 B2 * | 2/2014 | Radinger | ................ | F16C 19/55 384/461 |
| 2009/0196743 A1 * | 8/2009 | Ueno | ..................... | F01D 11/003 415/174.5 |

* cited by examiner

Primary Examiner — Thomas R. Hannon
(74) Attorney, Agent, or Firm — Volpe and Koenig, P.C.

(57) ABSTRACT

A tiered bearing assembly including first and second pluralities of tapered rolling elements and a common center ring arranged between the first and second pluralities of tapered rolling elements with a Z-shaped profile in cross-section is provided. A taper direction of the first plurality of tapered rolling elements is opposite to a taper direction of the second plurality of tapered rolling elements.

14 Claims, 6 Drawing Sheets

TIERED AXIAL TAPER ROLLER BEARING WITH COMMON CENTER RING

FIELD OF INVENTION

The present invention relates to a tiered bearing assembly.

BACKGROUND

Bearing assemblies are used in a wide variety of applications. Axial bearing assemblies are a common type of bearing assembly that typically include cylindrical or tapered rolling elements. One known tapered rolling bearing assembly is disclosed in U.S. Pat. No. 8,523,453, which discloses two pluralities of tapered rolling elements having the same taper direction. Another bearing assembly is disclosed in U.S. Pat. No. 6,857,787 and includes cylindrical rolling elements with a generally flat common center ring.

It would be desirable to provide an improved tiered bearing assembly that is adaptable for non-uniform diameter applications, as well as being capable of supporting increased loads and higher speeds.

SUMMARY

A tiered bearing assembly is provided. The tiered bearing assembly includes a first plurality of tapered rolling elements and a second plurality of tapered rolling elements. A first ring defines a first outer raceway on which the first plurality of tapered rolling elements run and a second ring defines a second outer raceway on which the second plurality of tapered rolling elements run. A center ring is arranged between the first plurality of tapered rolling elements and the second plurality of tapered rolling elements. The center ring includes a radially inner rim and a radially outer rim connected by an angled central portion that forms an angle of less than 90° with each of the radially inner rim and the radially outer rim, such that the center ring has a Z-shaped profile in cross-section. The central portion has a first side that defines a first inner raceway on which the first plurality of tapered rolling elements run and has a second, opposite side that defines a second inner raceway on which the second plurality of tapered rolling elements run. A taper direction of the first plurality of tapered rolling elements is opposite to a taper direction of the second plurality of tapered rolling elements.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
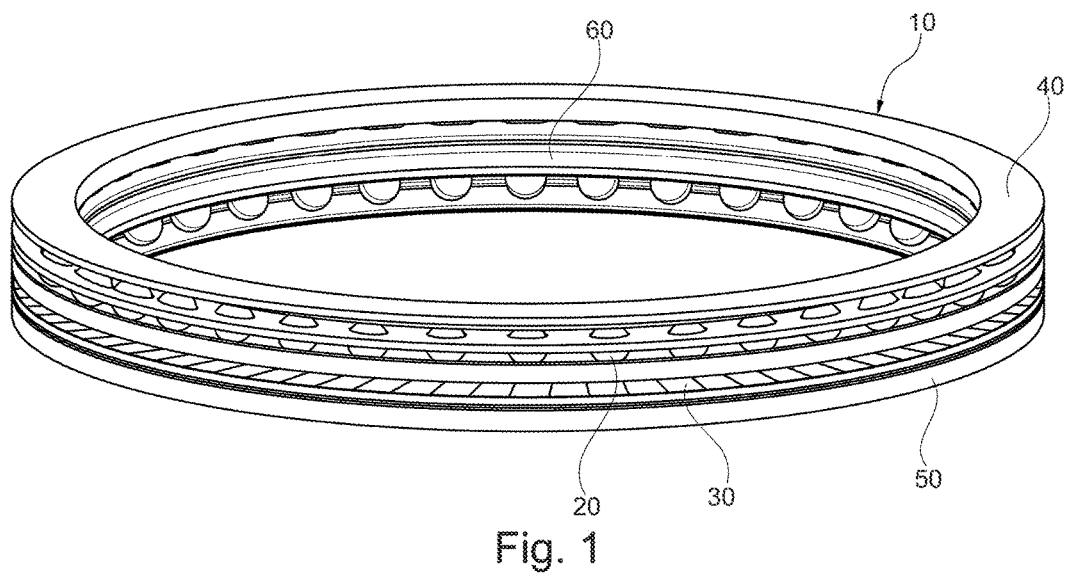
FIG. 1 is a perspective view of a first embodiment of a tiered bearing assembly according to the invention.
Figure 2:
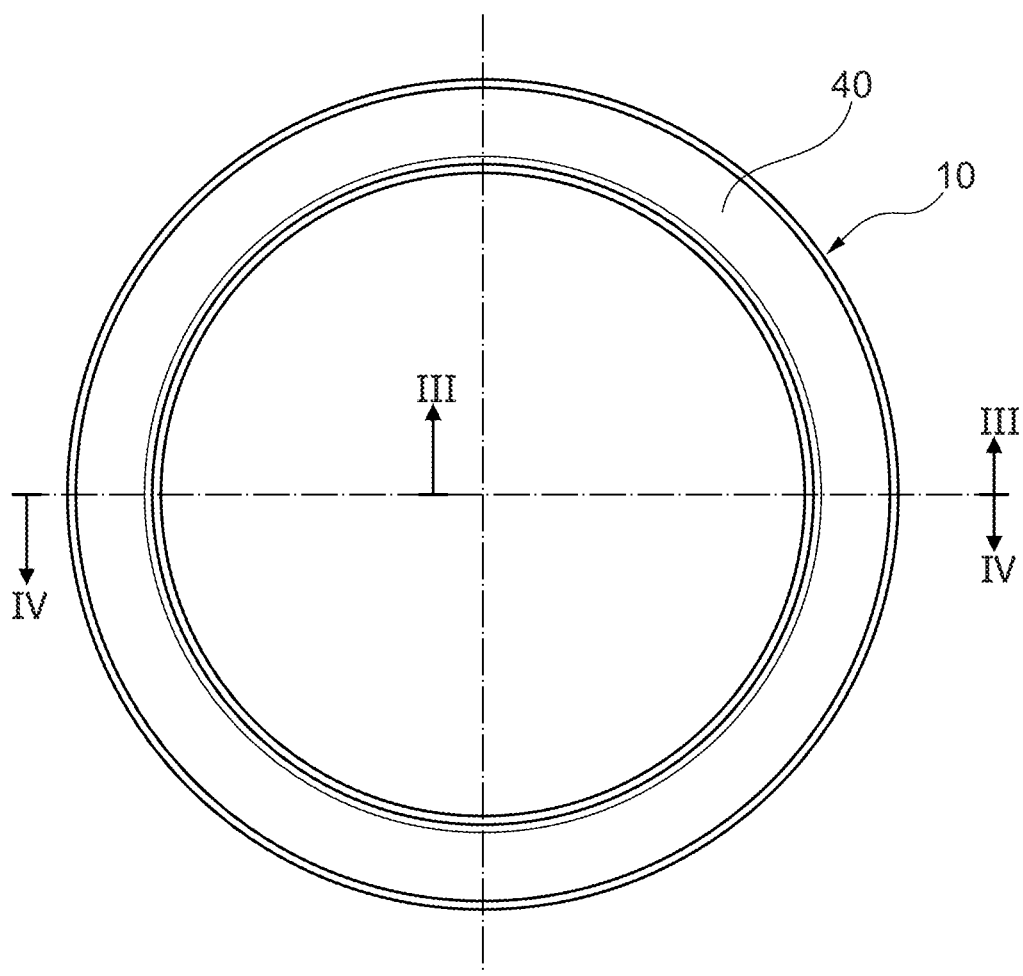
FIG. 2 is a top plan view of the tiered bearing assembly of FIG. 1.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft or bearing. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring to FIGS. 1-4, a first embodiment of a tiered bearing assembly 10 is shown. The tiered bearing assembly 10 includes a first plurality of tapered rolling elements 20 and a second plurality of tapered rolling elements 30. A first ring 40 defines a first outer raceway 42 on which the first plurality of tapered rolling elements 20 run. A second ring 50 defines a second outer raceway 52 on which the second plurality of tapered rolling elements 30 run.

Figure 3:
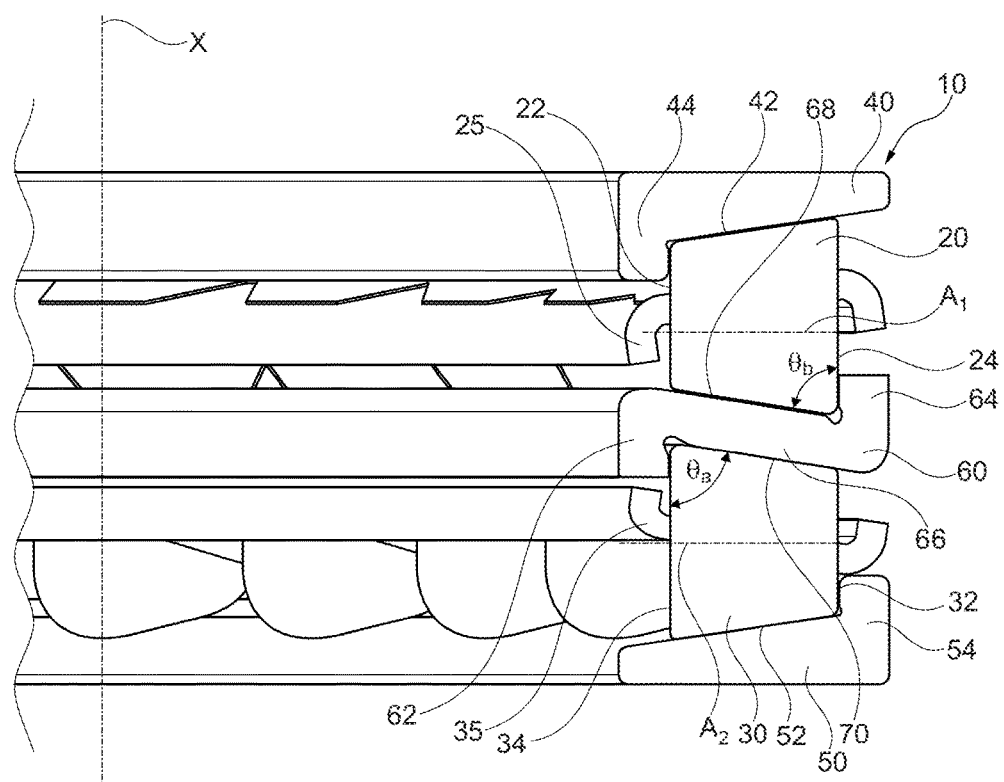
FIG. 3 is a cross section view of the tiered bearing assembly along line III-III of FIG. 2.

As shown in FIG. 3 an axis $A_1$ of each rolling element in the first plurality of tapered rolling elements 20 and an axis $A_2$ of each rolling element in the second plurality of tapered rolling elements are each preferably perpendicular to a longitudinal axis X of the tiered bearing assembly 10. A first cage 25 is provided for supporting the first plurality of tapered rolling elements 20 and a second cage 35 is provided for supporting the second plurality of tapered rolling elements 30.

A center ring 60 is arranged between the first plurality of tapered rolling elements 20 and the second plurality of tapered rolling elements 30. The center ring 60 includes a radially inner rim 62 and a radially outer rim 64 connected by an angled central portion 66 that forms an angle θa, θb of less than 90° with each of the radially inner rim 62 and the radially outer rim 64. The center ring 60 has a Z-shaped profile in cross-section, as most clearly shown in FIG. 3. The central portion 66 of the center ring 60 has a first side that defines a first inner raceway 68 on which the first plurality of tapered rolling elements 20 run and has a second, opposite side that defines a second inner raceway 70 on which the second plurality of tapered rolling elements 30 run. As shown most clearly in FIGS. 3 and 4, a taper direction of the first plurality of tapered rolling elements 20 is opposite to a taper direction of the second plurality of tapered rolling elements 30. One of ordinary skill in the art would recognize from the present disclosure that the angles θa, θb of the angled central potion 66 can be varied while maintaining the Z-shaped profile in cross-section to accommodate the tapered rolling elements 20, 30. Although the angles θa, θb are illustrated as being the same in FIG. 3, one of ordinary skill in the around would recognize from the present disclosure that the angles θa, θb can be different from each other in order to accommodate a first plurality of tapered rolling elements that are differently sized and/or shaped from a second plurality of tapered rolling elements. For example, the thickness of the central portion 66 can vary from the inner rim 62 to the outer rim 64 to accommodate different taper angles θa, θb while still maintaining the axes $A_1$, $A_2$ perpendicular to the longitudinal axis X.

As shown in FIG. 3, the first ring 40 includes a first ring rim 44 that extends towards the center ring 60 and contacts a first axial end surface 22 of the first plurality of tapered rolling elements 20. The radially outer rim 64 of the center ring 60 contacts a second axial end surface 24 of the first plurality of tapered rolling elements 20. The second ring 50 includes a second ring rim 54 that extends towards the center ring 60 and contacts a first axial end surface 32 of the second plurality of tapered rolling elements 30. The radially inner rim 62 of the center ring 60 contacts a second axial end surface 34 of the second plurality of tapered rolling elements 30. One of ordinary skill in the art will recognize from the present disclosure that the arrangement of the rims 44, 54, 62, and 64 can be varied depending on a specific application.

Figure 4:
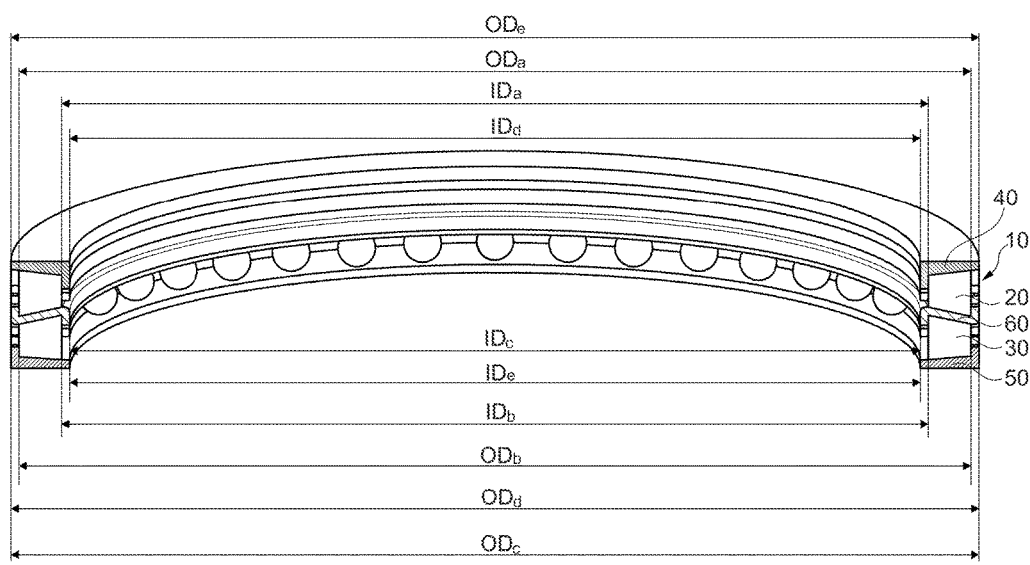
FIG. 4 is a cross section view of the tiered bearing assembly along line IV-IV of FIG. 2.

As shown in FIG. 4, an outer path diameter $OD_a$ of the first plurality of tapered rolling elements 20 is identical to an outer path diameter $OD_b$ of the second plurality of tapered rolling elements 30. An inner path diameter $ID_a$ of the first plurality of tapered rolling elements 20 is identical to an inner path diameter $ID_b$ of the second plurality of tapered rolling elements 30. An inner diameter $ID_c$ of the center ring 60 is equal to an inner diameter $ID_d$ of the first ring 40 and an inner diameter $ID_e$ of the second ring 50. An outer diameter $OD_c$ of the center ring 60 is equal to an outer diameter $OD_d$ of the second ring 50 and an outer diameter $OD_e$ of the first ring 40.

Figure 5:
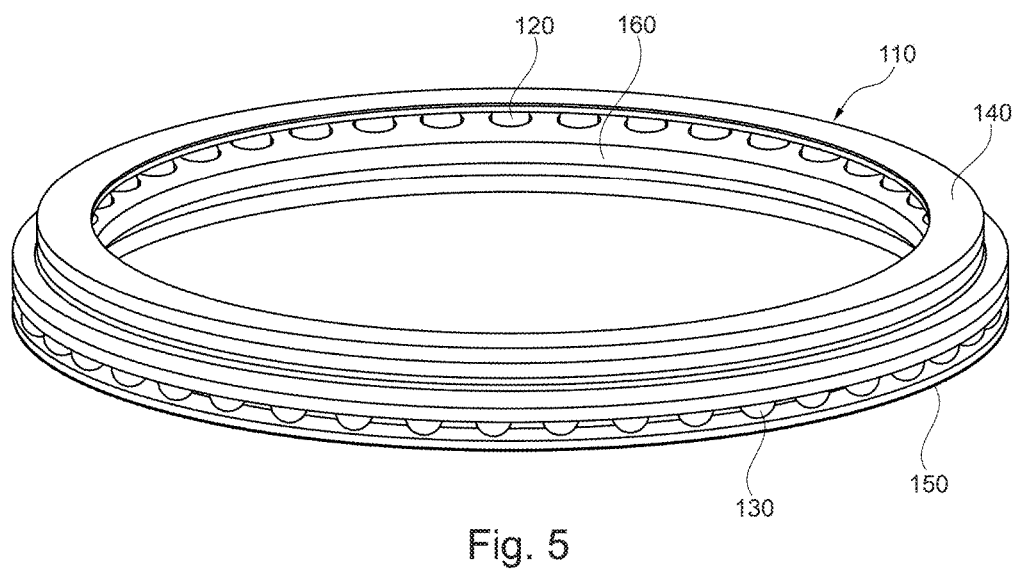
FIG. 5 is a perspective view of a second embodiment of a tiered bearing assembly according to the invention.
Figure 6:
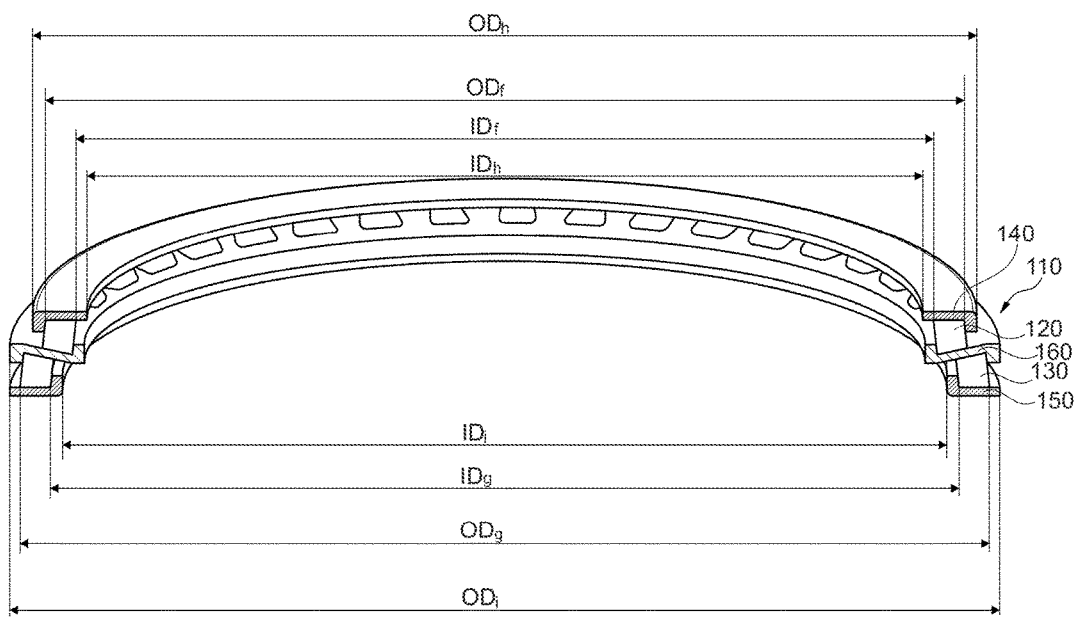
FIG. 6 is a cross section view of the second embodiment of the tiered bearing assembly of FIG. 5.

A second embodiment of a tiered bearing assembly 110 is shown in FIGS. 5 and 6. The second embodiment of the tiered bearing assembly 110 is configured to accommodate multiple rows of rolling elements arranged about different rolling path diameters. The second embodiment of the tiered bearing assembly 110 is similar to the first embodiment of the tiered bearing assembly 10 except that the first ring 140 has a smaller diameter than a diameter of the second ring 150. The second embodiment of the tiered bearing assembly 110 includes a center ring 160 having generally the same shape and features as described above with respect to the center ring 60 of the first embodiment of the tiered bearing assembly 10.

As shown in FIG. 6, an inner path diameter $ID_f$ of the first plurality of tapered rolling elements 120 is different than an inner path diameter $ID_g$ of the second plurality of tapered rolling elements 130. As shown in FIG. 6, the inner path diameter $ID_f$ of the first plurality of tapered rolling elements 120 is less than the inner path diameter $ID_g$ of the second plurality of tapered rolling elements 130. Although not illustrated in the drawings, one of ordinary skill in the art would recognize that in another embodiment the inner path diameter $ID_f$ of the first plurality of tapered rolling elements 120 can be greater than the inner path diameter $ID_g$ of the second plurality of tapered rolling elements 130. In the second embodiment of the tiered bearing assembly 110, an outer path diameter $OD_f$ of the first plurality of tapered rolling elements 120 is different than an outer path diameter $OD_g$ of the second plurality of tapered rolling elements 130. As shown in FIG. 6, the outer path diameter $OD_f$ of the first plurality of tapered rolling elements 120 is less than the outer path diameter $OD_g$ of the second plurality of tapered rolling elements 130. Although not illustrated in the drawings, one of ordinary skill in the art would recognize that in another embodiment the outer path diameter $OD_f$ of the first plurality of tapered rolling elements 120 can be greater than the outer path diameter $OD_g$ of the second plurality of tapered rolling elements 130. As shown in FIG. 6, an inner diameter $ID_h$ of the first ring 140 is less than an inner diameter $ID_i$ of the second ring 150, and an outer diameter $OD_h$ of the first ring 140 is less than an outer diameter $OD_i$ of the second ring 150.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A tiered bearing assembly comprising:
a first plurality of tapered rolling elements;
a second plurality of tapered rolling elements;
a first ring defining a first outer raceway on which the first plurality of tapered rolling elements run;
a second ring defining a second outer raceway on which the second plurality of tapered rolling elements run; and
a center ring arranged between the first plurality of tapered rolling elements and the second plurality of tapered rolling elements, the center ring including a radially inner arm and a radially outer arm connected by an angled central portion that forms an angle of less than 90° with each of the radially inner arm and the radially outer arm, the center ring having a Z-shaped profile in cross-section, the central portion having a first surface that defines a first inner raceway on which the first plurality of tapered rolling elements run and has a second, opposite surface that defines a second inner raceway on an opposite side of the central portion on which the second plurality of tapered rolling elements run, with a taper direction of the first plurality of tapered rolling elements being opposite to a taper direction of the second plurality of tapered rolling elements.

2. The tiered bearing assembly of claim 1, wherein the first ring includes a first ring rim extending towards the center ring, and the first ring rim contacts a first axial end surface of the first plurality of tapered rolling elements.

3. The tiered bearing assembly of claim 2, wherein the radially outer rim of the center ring contacts a second axial end surface of the first plurality of tapered rolling elements.

4. The tiered bearing assembly of claim 1, wherein the second ring includes a second ring rim extending towards the center ring, the second ring rim abuts a first axial end surface of the second plurality of tapered rolling elements.

5. The tiered bearing assembly of claim 4, wherein the radially inner rim of the center ring contacts a second axial end surface of the second plurality of tapered rolling elements.

6. The tiered bearing assembly of claim 1, wherein an outer path diameter of the first plurality of tapered rolling elements is identical to an outer path diameter of the second plurality of tapered rolling elements.

7. The tiered bearing assembly of claim 1, wherein an inner path diameter of the first plurality of tapered rolling elements is identical to an inner path diameter of the second plurality of tapered rolling elements.

8. The tiered bearing assembly of claim 1, wherein an inner path diameter of the first plurality of tapered rolling elements is different than an inner path diameter of the second plurality of tapered rolling elements.

9. The tiered bearing assembly of claim 1, wherein an outer path diameter of the first plurality of tapered rolling elements is different than an outer path diameter of the second plurality of tapered rolling elements.

10. The tiered bearing assembly of claim 1, wherein an inner diameter of the first ring is less than an inner diameter of the second ring.

11. The tiered bearing assembly of claim 1, wherein an outer diameter of the first ring is less than an outer diameter of the second ring.

12. The tiered bearing assembly of claim 1, wherein an inner diameter of the center ring is equal to an inner diameter of the first ring and equal to an inner diameter of the second ring.

13. The tiered bearing assembly of claim 12, wherein an outer diameter of the center ring is equal to an outer diameter of the first ring and equal to an outer diameter of the second ring.

14. The tiered bearing assembly of claim 1, wherein axes of each of the first plurality of tapered rolling elements and axes of each of the second plurality of tapered rolling elements are each perpendicular to a longitudinal axis of the tiered bearing assembly.

* * * * *